United States Patent
Jiang

(10) Patent No.: US 8,564,942 B2
(45) Date of Patent: Oct. 22, 2013

(54) FOLDABLE KEYBOARD

(75) Inventor: Xiao-Qun Jiang, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 601 days.

(21) Appl. No.: 12/912,754

(22) Filed: Oct. 27, 2010

(65) Prior Publication Data

US 2011/0279289 A1    Nov. 17, 2011

(30) Foreign Application Priority Data

May 17, 2010  (CN) .......................... 2010 1 0173766

(51) Int. Cl.
    *H05K 5/00*    (2006.01)
(52) U.S. Cl.
    USPC .............. 361/679.15; 361/679.14; 361/679.1; 341/20; 400/492; 400/472
(58) Field of Classification Search
    USPC ...................... 341/20, 22; 361/679.1–679.14; 400/492, 472
    See application file for complete search history.

(56) References Cited

U.S. PATENT DOCUMENTS

| | | | |
|---|---|---|---|
| 5,198,991 A * | 3/1993 | Pollitt ....................... 361/679.14 |
| 5,278,779 A * | 1/1994 | Conway et al. .......... 361/679.16 |
| 5,982,612 A * | 11/1999 | Roylance ................. 361/679.14 |
| 5,995,025 A * | 11/1999 | Sternglass et al. ............... 341/22 |
| 6,055,153 A * | 4/2000 | Chiu et al. ............... 361/679.14 |
| 6,698,957 B2 * | 3/2004 | Huang .......................... 400/472 |
| 6,707,664 B2 * | 3/2004 | Murphy ................... 361/679.16 |
| 6,734,809 B1 * | 5/2004 | Olodort et al. .................. 341/22 |
| 6,793,421 B1 * | 9/2004 | Baldwin et al. ............... 400/488 |
| 2004/0169593 A1 * | 9/2004 | Olodort et al. .................. 341/22 |
| 2004/0190230 A1 * | 9/2004 | Mochizuki et al. ........... 361/600 |
| 2006/0170569 A1 * | 8/2006 | Kubo et al. ...................... 341/22 |

* cited by examiner

*Primary Examiner* — Albert Wong
(74) *Attorney, Agent, or Firm* — Altis Wispro Law Group, Inc.

(57) ABSTRACT

A foldable keyboard includes a main keyboard and a sub keyboard. The main keyboard includes a first edge, first keys, and a first housing on the first edge. The first housing defines a first recess with at least one inlet communicating with the first recess. The sub keyboard includes a second rotatably coupled to the first edge of the main keyboard, second keys, a second housing, a latching member, and at least one ejecting member. The second housing defines a second recess with at least one outlet and at least one cavity communicating with the second recess. The latching member is movably received in the second recess. The at least one ejecting member is respectively received in the at least one cavity and can be moved to eject the latching member out of the at least one outlet and into the at least one inlet of the main keyboard.

7 Claims, 6 Drawing Sheets

FOLDABLE KEYBOARD

BACKGROUND

1. Technical Field

The present disclosure relates to keyboards, especially to a foldable keyboard.

2. Description of the Related Art

Conventional keyboards include a main keyboard and a sub keyboard which are fixed to each other. Though the conventional keyboards satisfy basic requirements, there is still the need for a new type of keyboard that has a main keyboard and a sub keyboard that can be folded to each other.

BRIEF DESCRIPTION OF THE DRAWINGS

The components of the drawings are not necessarily drawn to scale, the emphasis instead being placed upon clearly illustrating the principles of a foldable keyboard. Moreover, in the drawings, like reference numerals designate corresponding parts throughout several views.

DETAILED DESCRIPTION

Figure 1:
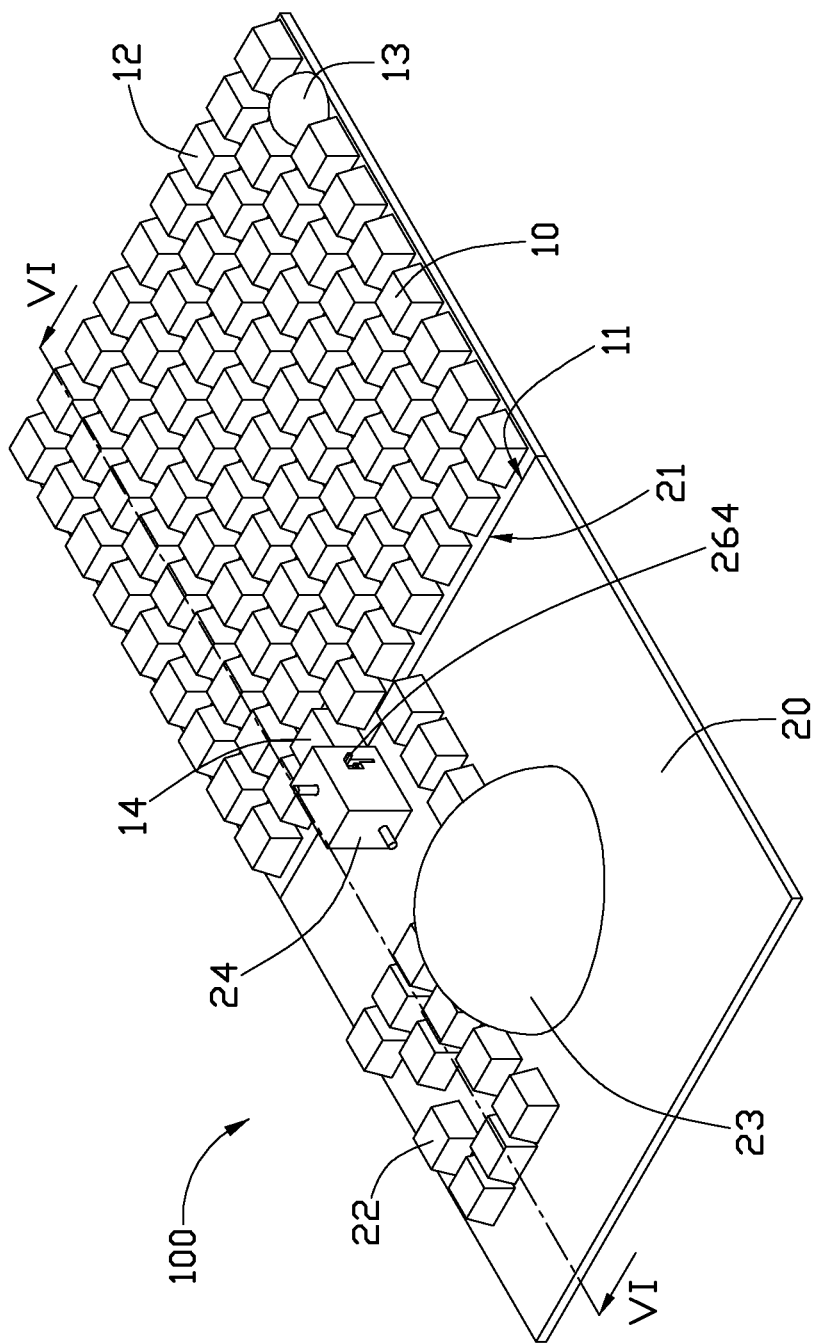
FIG. 1 is an isometric view of a foldable keyboard according to an exemplary embodiment.
Figure 2:
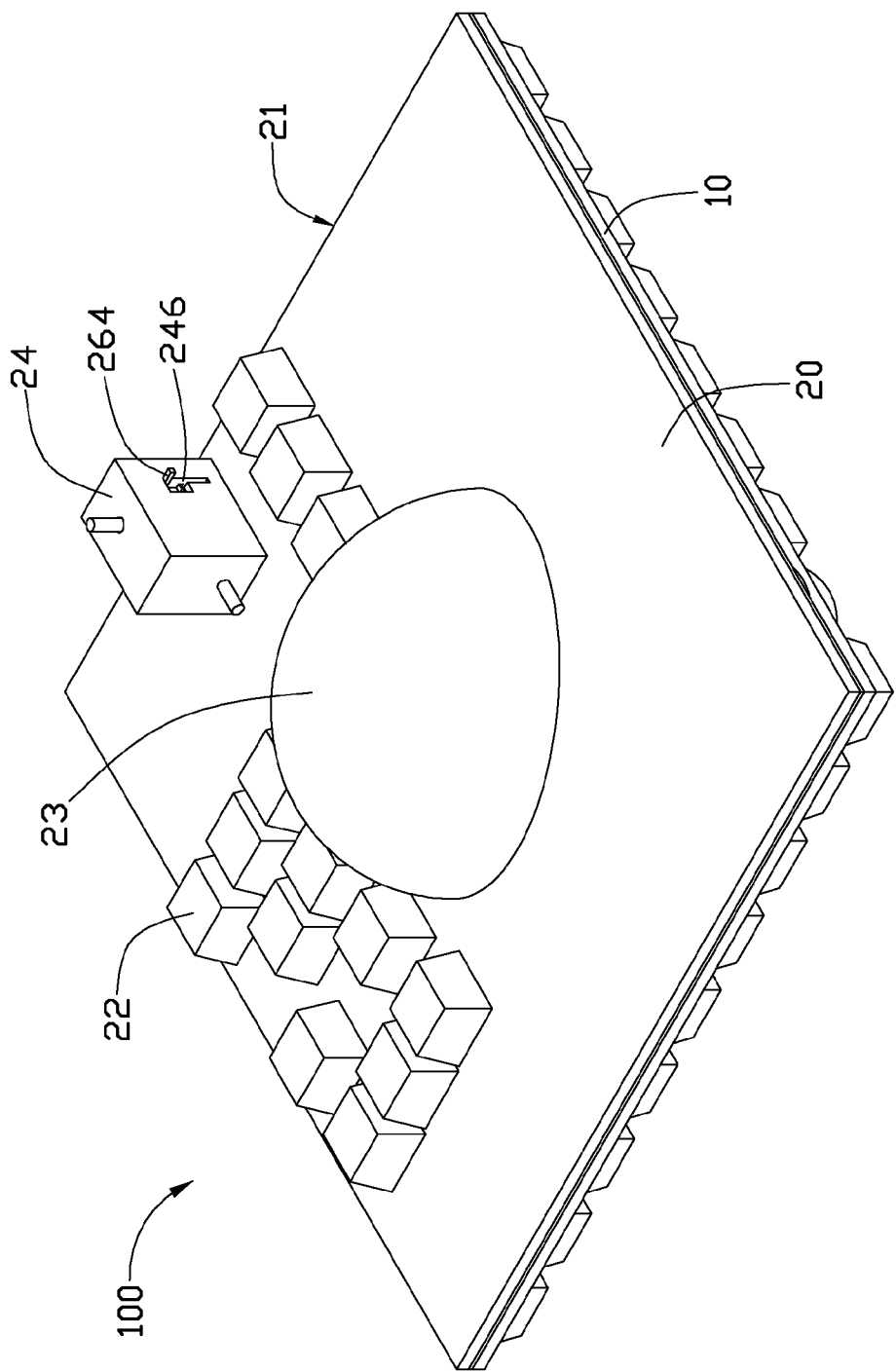
FIG. 2 is an isometric view of the foldable keyboard of FIG. 1, showing the keyboard in a folded state.
Figure 3:
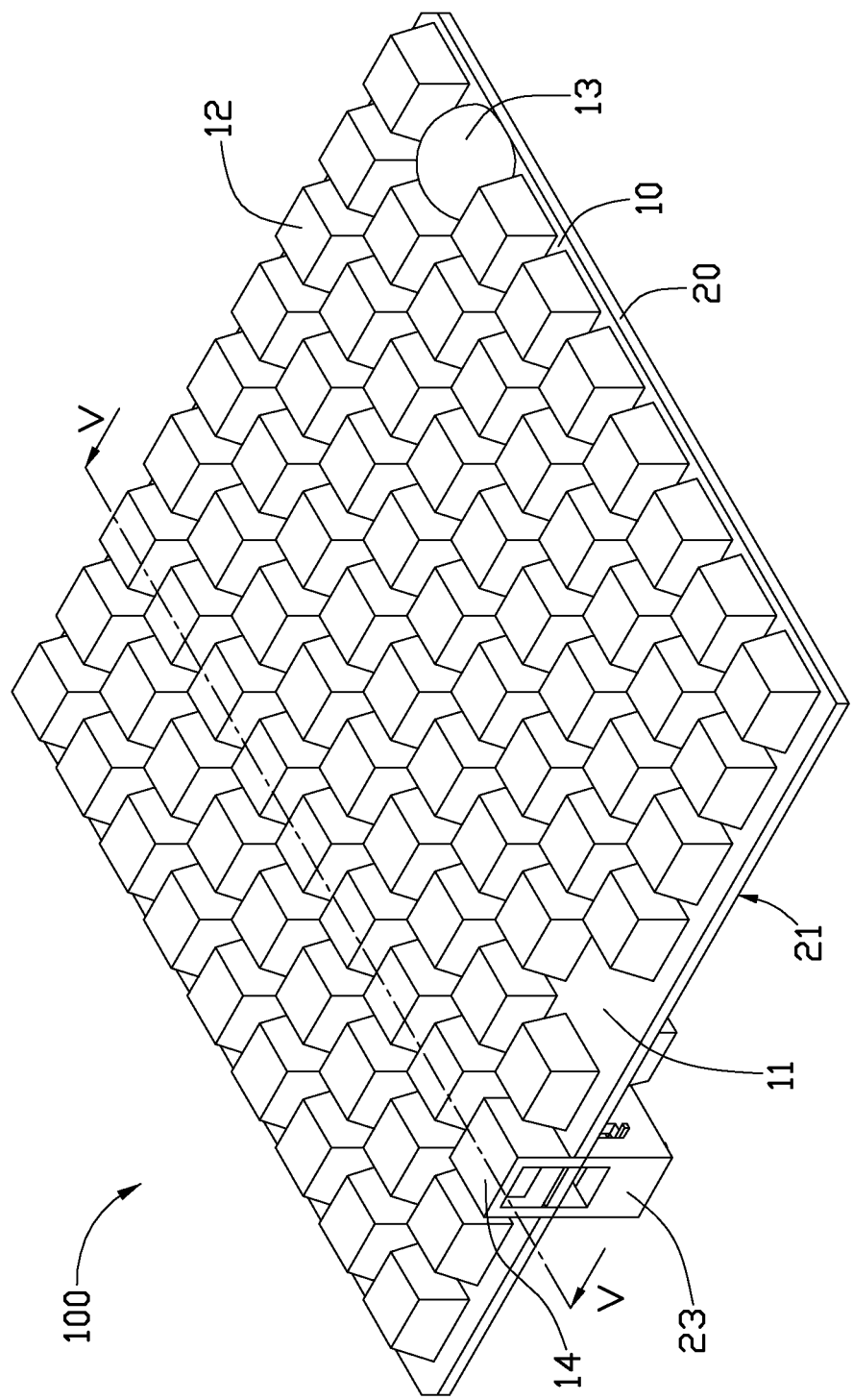
FIG. 3 is similar to FIG. 2, but viewed from another side.

Referring to FIGS. 1-3, a foldable keyboard 100 according to an exemplary embodiment is illustrated. The foldable keyboard 100 includes a main keyboard 10 and a sub keyboard 20 rotatably connected to each other. The main keyboard 10 includes a first edge 11, a plurality of first keys 12, and a joystick 13 located among the keys 12. The sub keyboard 20 includes a second edge 21 rotatably coupled to the first edge 11 of the main keyboard 10, a plurality of second keys 22, and a holding member 23 positioned centrally on the sub keyboard 20.

FIG. 1 shows the foldable keyboard 100 in an unfolded or open state. In the open state, the keyboard 100 can be placed on a support surface and used in the same manner as a conventional keyboard. FIGS. 2 and 3 show the foldable keyboard 100 in a folded state. In the folded state, the holding member 23 of the sub keyboard 20 can be grasped by one hand of the user to hold the keyboard 100, and the main keyboard 10 is used in a conventional manner.

Figure 4:
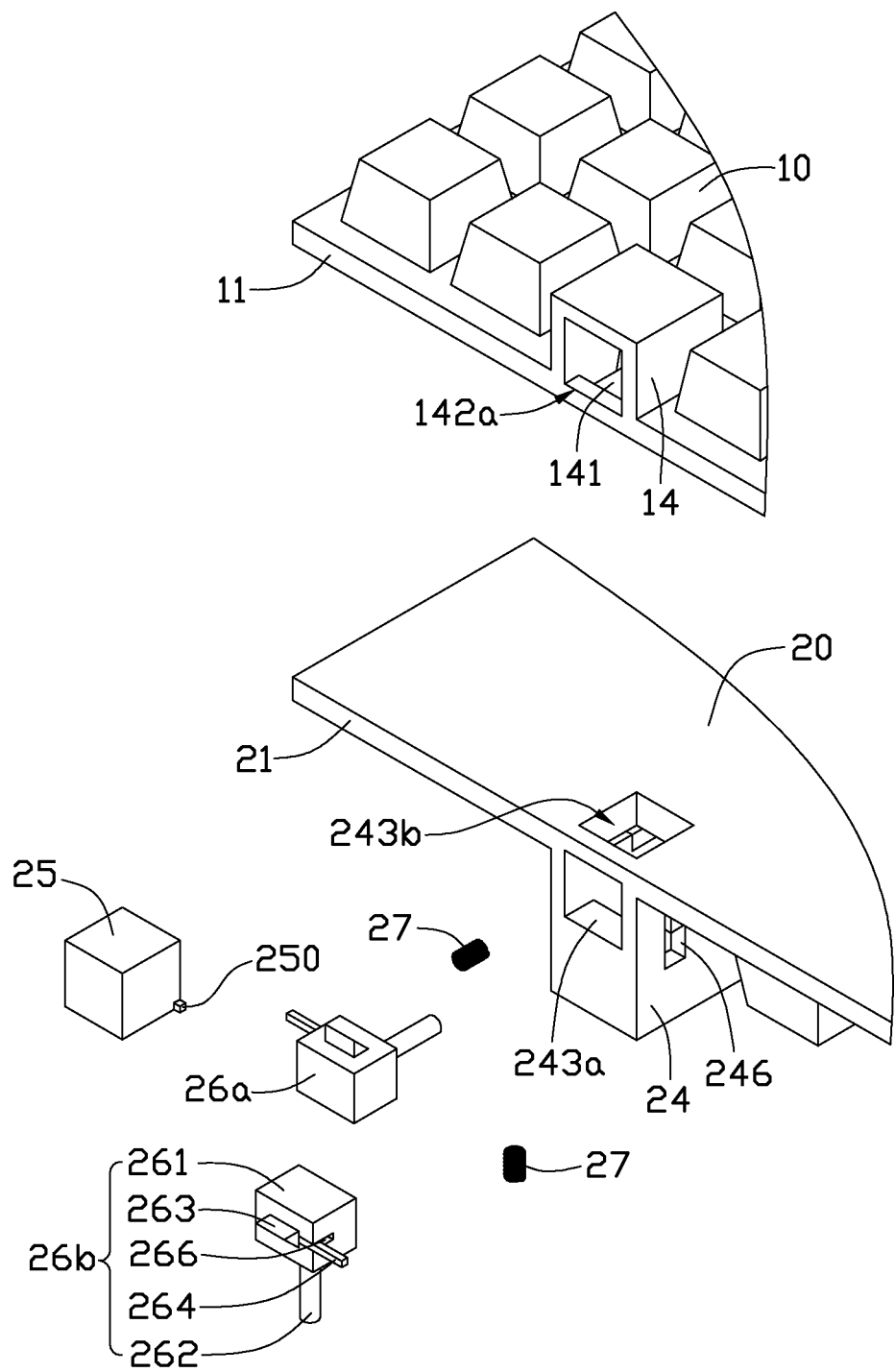
FIG. 4 is a partial, exploded view of the foldable keyboard of FIG. 1.

Referring also to FIG. 4, the first edge 11 of the main keyboard 10 forms a first housing 14 thereon, and the second edge 21 of the sub keyboard 20 forms a second housing 24 corresponding to the first housing 14. The first housing 14 and the second housing 24 are both cuboids in shape. The first housing 14 defines a first recess 141 therein and two inlets (hereinafter first inlet 142a, second inlet 142b) communicating with the first recess 141.

Figure 5:
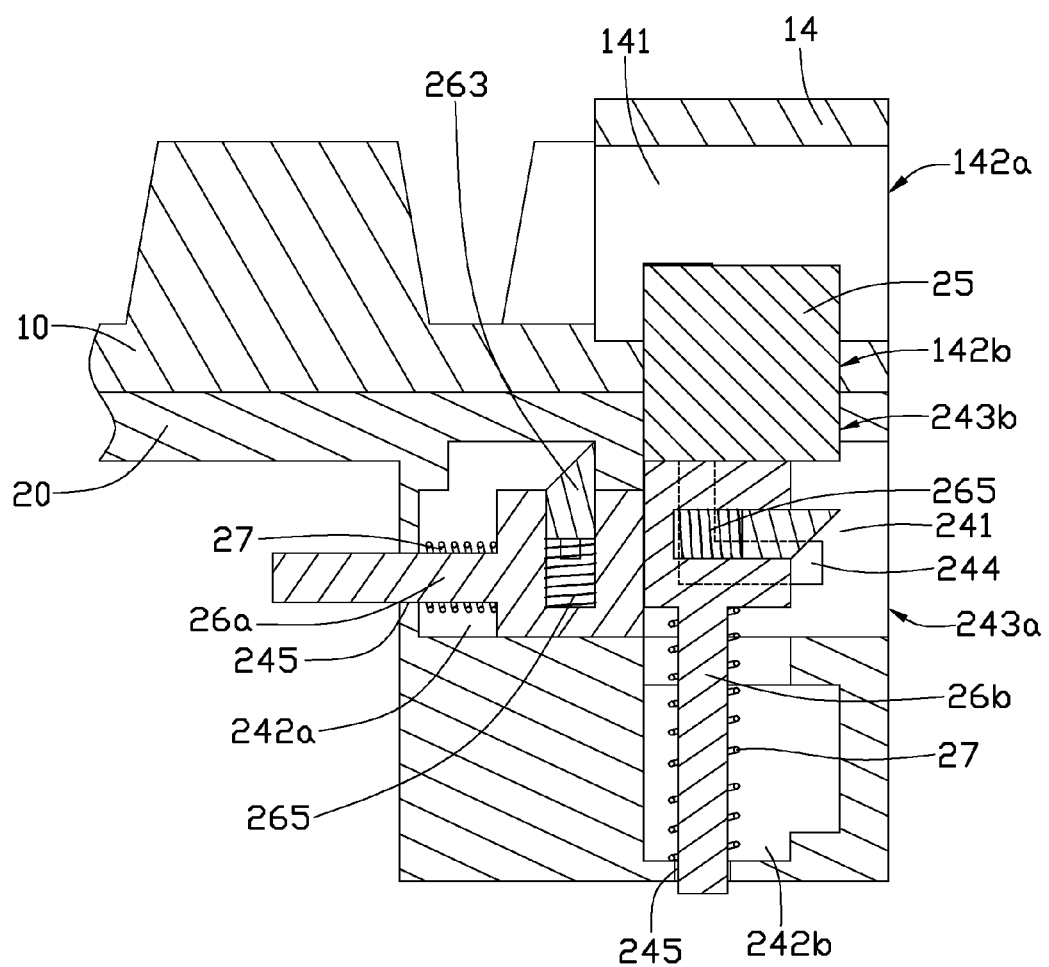
FIG. 5 is a cross-section view of the foldable keyboard, taken along the line V-V of FIG. 1.

Referring also to FIG. 5, the second housing 24 therein defines a second recess 241, two cavities 242a and 242b (hereinafter first cavity 242a and second cavity 242b) communicating with the second recess 241. The second recess 241 defines two outlets (hereinafter first outlet 243a and second outlet 243b) communicating with the second recess 241, and an L-shaped groove 244 in an inner side thereof. The first cavity 242a and the second cavity 242b each define a locating hole 245 and an opening 246.

The sub keyboard 20 further includes a latching member 25, two ejecting members 26a and 26b (hereinafter first ejecting member 26a and second ejecting member 26b), and two resilient members 27. The latching member 25 is movably received in the recess 241 of the second housing 24 and defines a protrusion 250 that is fit into the groove 244. The latching member 25 can be moved along the groove 244 and latched into the first recess 141 of the first housing 14. The first ejecting member 26a and the second ejecting member 26b have the same structure. The second ejecting member 26b includes an ejecting portion 261 defining an indentation 266, a locating rod 262 connected to the ejecting portion 261, a blocking member 263 movably received in the indentation 266, and a helical spring 265 compressed between the blocking member 263 and the ejecting portion 261. The blocking member 263 includes a pin 264. The first ejecting member 26a and the second ejecting member 26b are respectively received in the first cavity 242a and the second cavity 242b. The locating rod 262 extends through the locating hole 245, the resilient member 27 is coiled around the locating rod 262, and the pin 264 protrudes out of the opening 246.

Figure 6:
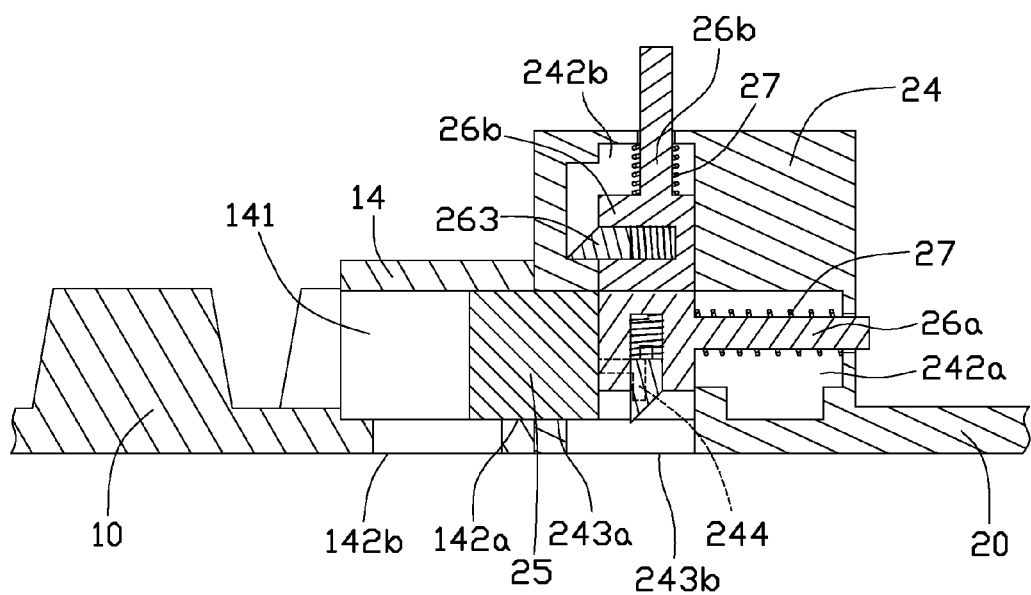
FIG. 6 is a cross-section view of the foldable keyboard, taken along the line VI-VI of FIG. 3.

Referring also to FIG. 6, when the helical spring 265 is compressed till the blocking member 263 disengages from the first cavity 242a or the second cavity 242b by pushing the pin 264, the first ejecting member 26a or the second ejecting member 26b can be moved into the recess 241 to eject the latching member 25 out of the first outlet 243a or the second outlet 243b. As shown in FIG. 5, when the second inlet 142b of the main keyboard 10 is aligned with the second outlet 243b of the sub keyboard 20, the second ejecting member 26b ejects the latching member 25 out of the second outlet 243b and into the second inlet 142b. Thus, the main keyboard 10 and the sub keyboard 20 are folded together as shown in FIGS. 2 and 3. As shown in FIG. 6, when the first inlet 142a is aligned with the first outlet 243a, the first ejecting member 26a ejects the latching member 25 out of the first outlet 243a and into the first inlet 142a. Thus, the main keyboard 10 and the sun keyboard 20 are unfolded to the open state as shown in FIG. 1.

Although the present disclosure has been specifically described on the basis of certain embodiments thereof, the disclosure is not to be construed as being limited to the described embodiments. Various changes or modifications may be made to the embodiments without departing from the scope and spirit of the disclosure.

What is claimed is:

1. A foldable keyboard comprising:
   a main keyboard comprising:
      a first edge;
      a plurality of first keys; and
      a first housing formed on the first edge defining a first recess with at least one inlet communicating with the first recess; and
   a sub keyboard comprising:
      a second edge rotatably coupled to the first edge of the main keyboard;
      a plurality of second keys;
      a second housing defining a second recess with at least one outlet, and at least one cavity communicating with the second recess;
      a latching member movably received in the second recess; and
      at least one ejecting member respectively received in the at least one cavity and can be moved to eject the latching member out of one of the at least one outlet and into one of the at least one inlet of the main keyboard, thus the main keyboard and the sub keyboard are connected.

2. The foldable keyboard as described in claim 1, wherein the main keyboard further comprises a joystick located among the first keys.

3. The foldable keyboard as described in claim 1, wherein the sub keyboard comprises a holding member positioned centrally on the sub keyboard.

4. The foldable keyboard as described in claim 1, wherein the numbers of the at least one inlet, outlet, cavity, and ejecting member are two.

5. The foldable keyboard as described in claim 4, wherein the recess defines an L-shaped groove, and the latching member defines a protrusion fit in the groove.

6. The foldable keyboard as described in claim 4, wherein each ejecting member comprises an ejecting portion defining an indentation and a blocking member movably received in the indentation, and a helical spring compressed between the ejecting portion and the blocking member, the blocking member comprises a pin, and the cavity defines an opening for the pin protruding out of.

7. The foldable keyboard as described in claim 6, wherein the ejecting member comprises an ejecting portion and a locating rod connected to the ejecting portion, the second housing defines a locating hole for the locating rod extending through, and the sub keyboard further comprises two resilient member coiled around the locating rod.

\* \* \* \* \*